(12) United States Patent
Teran et al.

(10) Patent No.: US 6,350,608 B1
(45) Date of Patent: Feb. 26, 2002

(54) BIOLOGICAL DIGESTION OF ANIMAL CARCASSES

(75) Inventors: Alfredo J. Teran; Richard G. Wood; W. Todd Willoughby, all of Cape Canaveral, FL (US)

(73) Assignee: AJT & Associates, Inc., Cape Canaveral, FL (US)

( * ) Notice: Subject to any disclaimer, the term of this patent is extended or adjusted under 35 U.S.C. 154(b) by 0 days.

(21) Appl. No.: 09/471,955

(22) Filed: Dec. 22, 1999

(51) Int. Cl.⁷ ............................... C12S 3/00; C05F 1/00
(52) U.S. Cl. ..................... 435/267; 435/245; 210/620; 71/9; 71/15
(58) Field of Search ................................ 435/243, 244, 435/245, 262, 267; 71/9, 15, 19, 20, 16; 241/39, DIG. 38; 83/53, 177; 210/619, 620

(56) References Cited

U.S. PATENT DOCUMENTS

| | | | |
|---|---|---|---|
| 3,429,806 A | | 2/1969 | Carter et al. .................... 210/3 |
| 3,462,275 A | * | 8/1969 | Bellamy |
| 3,778,233 A | | 12/1973 | Blough et al. .............. 23/259.1 |
| 3,961,078 A | * | 6/1976 | Stitt |
| 3,997,437 A | | 12/1976 | Prince et al. ................... 210/4 |
| 4,009,100 A | | 2/1977 | Hess et al. ..................... 210/14 |
| 4,053,394 A | | 10/1977 | Fisk ................................ 210/8 |
| 4,225,381 A | | 9/1980 | Ishikawa et al. .............. 162/51 |
| 4,259,361 A | | 3/1981 | Proctor ....................... 426/285 |
| 4,391,887 A | * | 7/1983 | Baumgarten et al. |
| 5,076,504 A | * | 12/1991 | Young |
| 5,206,169 A | | 4/1993 | Bland ......................... 435/284 |
| 5,423,988 A | | 6/1995 | Yamasaki et al. ........... 210/611 |
| 5,545,325 A | | 8/1996 | Hsu et al. .................... 210/605 |
| 5,651,891 A | | 7/1997 | Molof et al. ................. 210/605 |
| 5,853,588 A | | 12/1998 | Molof et al. ................. 210/605 |
| 6,039,874 A | | 3/2000 | Teran et al. ................. 210/605 |
| 6,193,889 B1 | | 2/2001 | Teran et al. ................. 210/609 |

FOREIGN PATENT DOCUMENTS

| | | | |
|---|---|---|---|
| CA | 2195473 A1 | * | 7/1998 |
| CH | 690957 A | * | 3/2001 |
| GB | 1 489 592 A | * | 10/1977 |
| JP | 58-99190 A | * | 6/1983 |

OTHER PUBLICATIONS

OA1 Rick Brooks, "North Carolina Hurricane Damages Rise", *The Wall Street Journal*, pg. A2, Sep. 21, 1999.
OA2 Florida Statute 1997, Chapter 823—Public Nuisances, pg. 1708; §823.041—"Disposal of Bodies of Dead Animals; Penalty".

* cited by examiner

*Primary Examiner*—William H. Beisner
(74) *Attorney, Agent, or Firm*—Brian S. Steinberger; Law Offices of Brian S. Steinberger

(57) ABSTRACT

A process is provided for the biological digestion of animal carcasses. First, the carcass is cut into smaller pieces with equipment that masticates, grinds or comminutes in the presence of water to create a solid-liquid mixture. The next steps include treating the solid-liquid mixture with a special blend or combination of bacteria that have been specifically cultured to digest the carcass; the mixture is subsequently aerated to form a stabilized biomass. The stabilized biomass is aerated in an open basin to further digest and liquefy the carcass, water, bacteria mixture. From the open basin, the primarily liquid waste stream is passed to a clarifying tank where the suspended solids are precipitated as sludge, thus clarifying the liquid. Sludge is removed from the clarifying chamber and the clarified liquid is either discharged or recirculated for further use in this novel process. In the preferred embodiment of the invention, technology known as hydrolaze is used to masticate, comminute or pulverize the carcass.

20 Claims, 3 Drawing Sheets

BIOLOGICAL DIGESTION OF ANIMAL CARCASSES
(FLOW DIAGRAM OF PROCESS)

COD reduction after settling without polymer, with polymer, and filtration.

1- Raw Waste
2- Supernatant (no polymer)
3- Supernatant (with polymer)
4- Supernatant after filtration

BIOLOGICAL DIGESTION OF ANIMAL CARCASSES

BACKGROUND AND PRIOR ART

As the human habitat expands and as more and more animals become domesticated or intertwined in the human environment, people take on the responsibility of disposing of animals that die. Animal deaths may be due to predators desire for foodstuff, disease, natural causes, or natural disasters, such as the recent Hurricane Floyd in North Carolina where state officials estimated that more than 100,000 hogs drowned in the deluge, which also killed one million chickens and turkeys (*The Wall Street Journal.* Tuesday, Sept. 21, 1999, page A2). Collecting, handling, transporting and disposing of dead animals are difficult and costly, since the carcasses soon become offensive and putrescible if left to decay by natural processes. Our world needs an inexpensive, ecologically safe process for disposing of dead animal carcasses.

Various means of disposing of animal carcasses are currently used. In North Carolina, *The Wall Street Journal* supra, reports that incinerators will be brought in to dispose of the carcasses of dead farm animals, contributing to a "smelly, stinky mess." Florida statute 823.041, mandates that the bodies of dead animals be disposed of by burning or burying at least 2 feet below the surface of the ground; or disposed of by rendering companies licensed to do business in the state.

Furthermore, it is taught in U.S. Pat. No. 3,429,806 that meatpacking waste, including blood, is disposed of through a series of three stabilization ponds and one aeration pond producing a discharge stream suitable for use as a soil conditioner. This elaborate system requires treatment for 10 days in each stabilization pond and 5 days in the aeration pond. Thus the process is not only costly but also time consuming. Aerobic liquid composting of animal waste is disclosed in U.S. Pat. No. 3,778,233; a rotating shaft and propeller induces air into liquefied animal waste. U.S. Pat. No. 5,206,169 teaches a composting system with increased ventilation and solar panels to provide heat of decomposition and evaporation of moisture that converts animal carcasses to carbon dioxide gas, water vapor and stabilized compost consisting of nitrogen, phosphorus, potassium and calcium. U.S. Pat. No. 3,997,437 uses an aerator which shears the solid particles while simultaneously adding oxygen to sludge being treated and recirculated for an extended period of time. Aeration is used primarily to digest sludge. U.S. Pat. No. 4,009,100 oxygenates a mixture of wastewater and activated sludge which is agitated to avoid settling using a water jet either at surface or just below the surface. U.S. Pat. No. 4,053,394 teaches the odorless recycling of raw sewage liquor treated with aerobic bacteria, air, oxygen, ozone, or a blend thereof to provide pure water. U.S. Pat. No. 5,423,988 discloses a waste treatment process with microorganisms from household waste to eliminate the need for an activated charcoal absorption tower.

More recently, U.S. Pat. Nos. 5,545,325; 5,651,891 and 5,853,588 disclose wastewater treatment processes which combine aerobic, anoxic and anaerobic treatment zones followed by a final clarification or settling step using a mechanical means or chemical means, such as a polymeric material to clarify the final effluent. Such multiple stage treatment processes are costly to build and operate, although purportedly less time is required for production of purified wastewater, e.g., days instead of months. Nonetheless, the cost of such customized construction would be a deterrent in reaching the desired goal of removing animal carcasses in an effort to cleanup the environment.

The waste disposal industry is still seeking an inexpensive, ecologically safe method for disposing of animal carcasses. The variety of disposal methods offered is, to some extent, evidence that none is without disadvantage. The present invention provides a more optimum, inexpensive solution for animal carcass disposal without noxious odors.

SUMMARY OF THE INVENTION

The first objective of the present invention is to provide a novel, inexpensive, on-site disposal process for animal carcasses.

The second objective of this invention is to provide a system for the disposal of animal carcasses in which space age technology, known as HYDROLAZE, is utilized in the disintegration/comminuting of a carcass.

The third objective of this invention is to provide a system for the disposal of dead animals that utilizes a primary aeration tank and a secondary aeration tank for the complete digestion and liquefaction of carcasses.

The fourth objective of this invention is to provide a system for the disposal of animal carcasses such that in the primary aeration tank a unique blend of bacteria is employed to efficiently digest the animal carcass.

The fifth objective of this invention is to provide a system for the disposal of animal carcasses that produces a clarified liquid that is reusable in the system as the liquid supply for comminuting and pulverizing animal carcasses.

The sixth objective of this invention is to provide a system for the disposal of animal carcasses that produces a clarified liquid that is suitable for further treatment and subsequent safe return to the environment.

The seventh objective of the present invention is to provide a system for the disposal of animal carcasses that eliminates noxious processing odors.

A preferred embodiment of the invention consists of the features of construction which are illustrated in FIGS. 1–3, wherein animal carcasses are processed through five units, including: 1. Comminuting/pulverizing chamber; 2. primary aeration tank; 3. secondary aeration tank; 4. clarifying tank and 5. a final disposal/reuse tank. The operating procedures and devices are hereinafter described in detail, the scope of which will be indicated in the appended claims.

Further objects and advantages of this invention will be apparent from the following detailed description of a presently preferred embodiment which is illustrated schematically in the accompanying drawings.

DESCRIPTION OF THE PREFERRED EMBODIMENT

Before explaining the disclosed embodiment of the present invention in detail it is to be understood that the invention is not limited in its application to the details of the particular arrangement shown since the invention is capable of other embodiments. Also, the terminology used herein is for the purpose of description and not of limitation.

The present invention is particularly described with respect to disposal of the carcasses of dead hogs, but it should be apparent to those skilled in the art that the teachings herein have other applications; for instance to the disposal of animal carcasses including, but not limited to, equine, bovine or marine animals, goat, sheep, swine, dog, cat, poultry or other beast or bird.

The present invention can also be used to dispose of animals whose deaths are due to disease or infection; however, added precautions, including sterilization or disinfection can be included since the aerobically digested water and solids from diseased animals may contain pathogenic organisms. The end products of this process, namely sludge and clarified water, may be treated with disinfecting agents such as ozone, heat, phenols, alcohols, strong acids or alkalies, and halogens which cause coagulation and denaturing of cell protein. Direct sunlight, ultraviolet rays, or ionizing radiation destroys pathogens. Chlorination, which has the undesirable by product of trihalomethane in certain applications, is the most frequently used disinfectant. With greater attention to control and dichlorination, it is relatively inexpensive, readily applied and controlled, and can be monitored by a simple and quick test. Thus, by employing a sterilization or disinfection step before the digested carcass end products are discharged, diseased animal carcasses are advantageously disposed of by this system.

Figure 1:
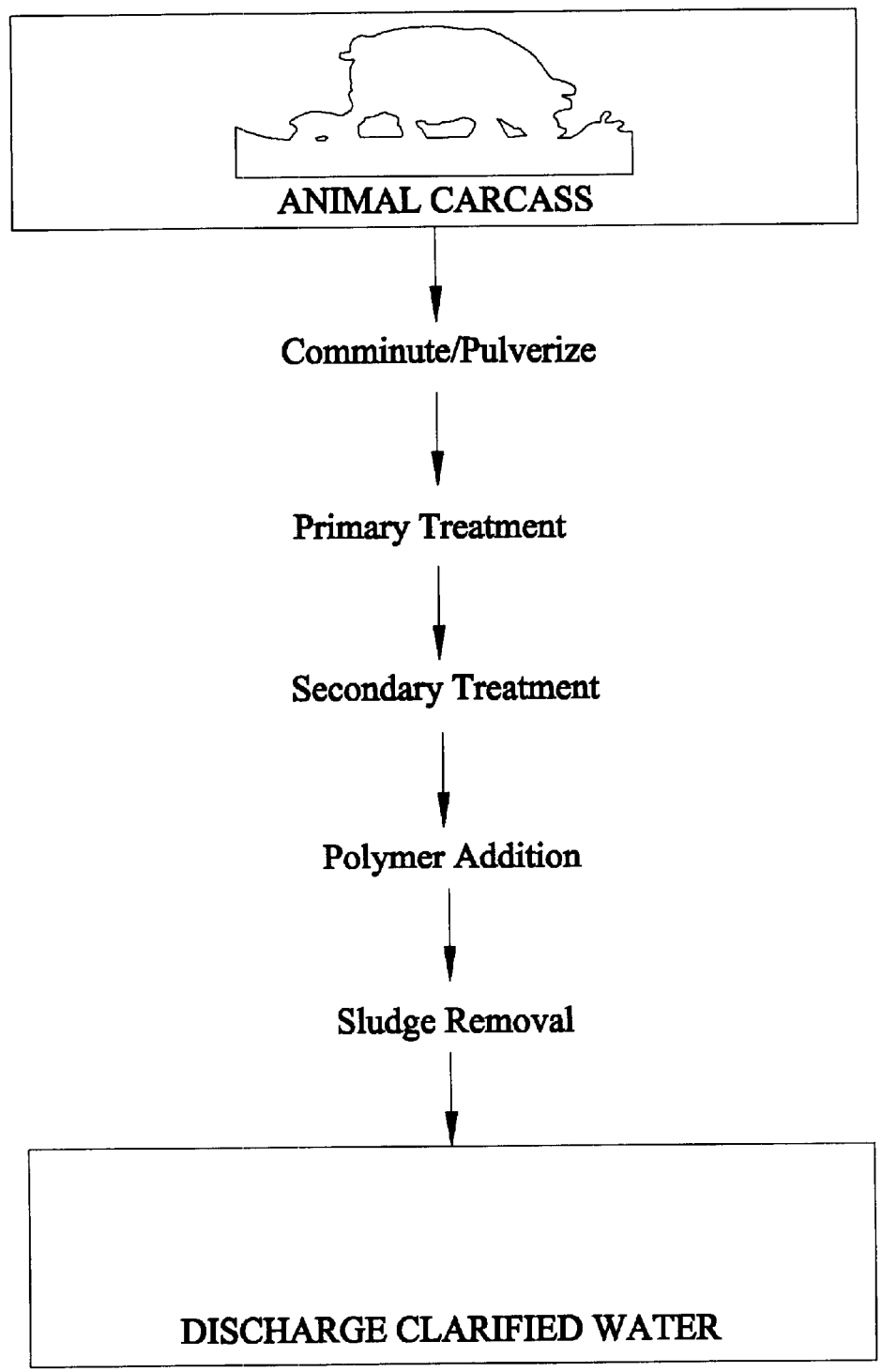
FIG. 1 is a flow chart of the process for disposing of animal carcasses.
Figure 2:
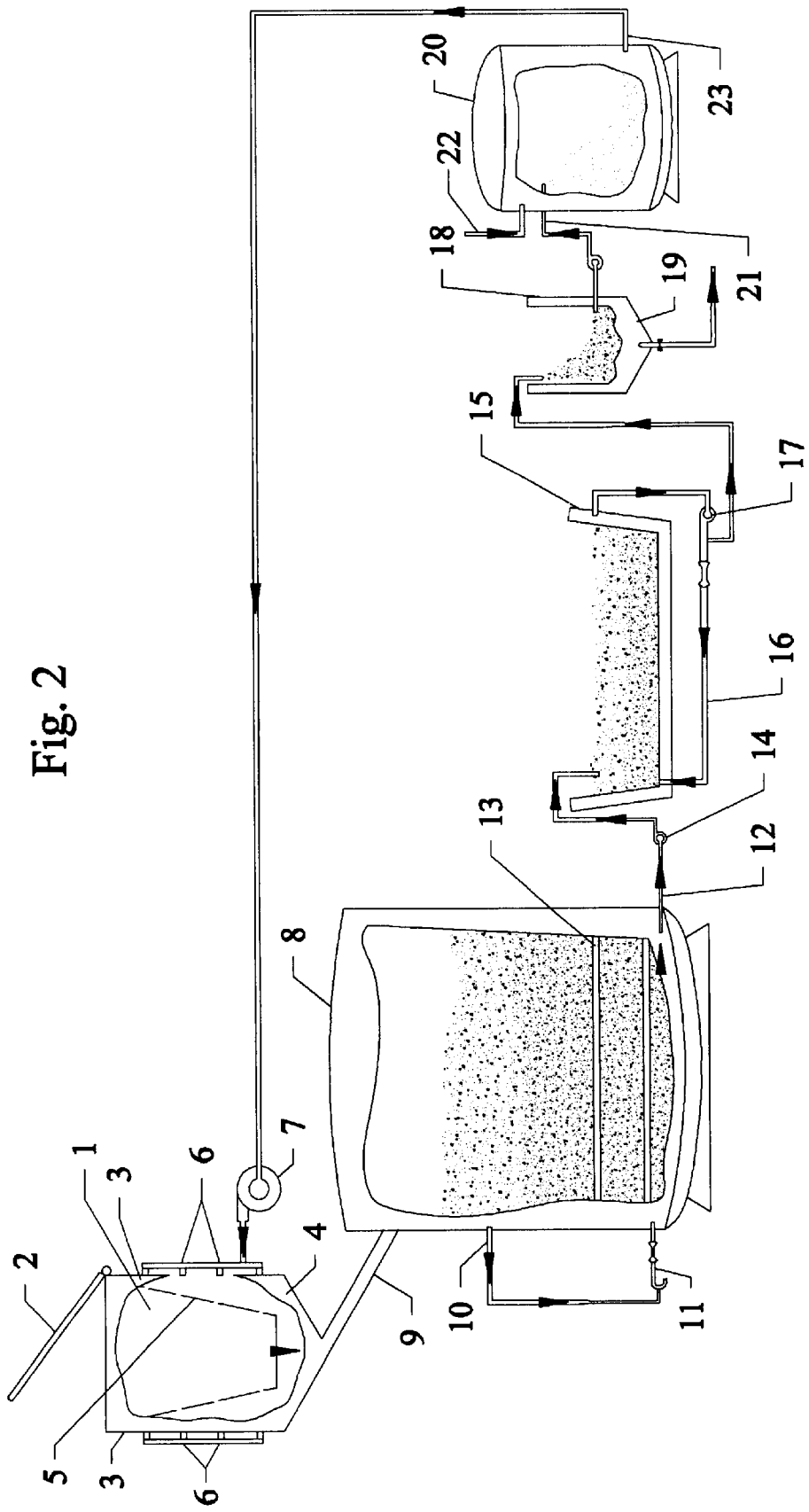
FIG. 2 is an illustrative cross-sectional view of a processing facility for the present invention.

Referring to FIGS. 1 and 2, each operating procedure and device used is listed below for further details.

Unit 1. Hydrolaze chamber. The dead hogs are placed in an enclosed chamber (1) wherein the top side consists of a hinged lid (2), with two vertical sides (3) and a bottom wall (4) housing a wide mesh basket (5); positioned along the vertical sides are both fixed and rotatable spray nozzles (6) that are integrally connected to a high pressure pump (7) through which fluid is pumped. Thus, when fluid flow and pump are activated, the animal carcass can be cut into approximately 10.25 cm to approximately 15.4 cm (4 to 6 inch) pieces in a matter of seconds and converted to a mixture of liquid-solid organic material, suitable for further processing in the aerobic treatment tanks. The action by the pressurized fluid and nozzle configuration is designated herein as hydrolaze.

The term "hydrolaze" as described above and shown in FIG. 2, shall mean water or any water-containing fluid fed through a high-pressure nozzle such that the water performs like a laser-cutting tool. The hydrolaze consists of one or more high pressure pumps and nozzles which can deliver water at pressures ranging from approximately 9,000 pounds per square inch (psi) to approximately 15,000 pounds per square inch (psi). The water is delivered from the pumps through high-pressure hoses to the nozzles which then direct the water towards the carcass. The nozzles are designed to provide a water stream less than five millimeters in diameter. The combination of high pressure and the "pinpoint" stream of water results in a concentrated force in a very small area which will easily cut through the skin and bone of the animal carcass. The nozzles are both fixed and oscillating to ensure complete coverage of the interior of the pulverizing chamber (Unit 1) and complete mastication of the animal carcass. The water used can be recycled water carrying the cultured bacteria from the previous treatment cycle and thus the bacteria can begin the digestion process in the pulverizing chamber. The effective range of fluid pressure exiting the nozzles can be in a range between approximately 9,000 psi and 15,000 psi.

The interior of the chamber contains a steel mesh with openings from approximately 10.25 centimeters (4 inches) to approximately 15.4 centimeters (6 inches) square. This creates a basket which hold the carcass and prevents further processing of pieces larger than the mesh openings. The result is a more homogenous mix of animal carcass, water and bacteria which will speed up the digestion process. Thus, the hydrolaze pulverized carcass is treated to form a solid-liquid mixture suitable for processing in the primary aeration tank (Unit 2).

Unit 2. The Primary Aeration Tank is a fully enclosed chamber (8) having three inlets; one for receiving the mixture from Unit 1 (9), another for introduction of the bacterial culture (10) and a third inlet for air (11). One outlet (12) is positioned at the bottom of the tank to permit removal of the aerated mixture from Unit 2. The interior of the chamber contains a small mesh grating (13) which retains the large solids in the solid-liquid mixture from Unit 1 in a position for prolonged contact with the bacterial culture that is introduced. Bacteria and a combination of bacteria referred to as a special blend of bacteria are introduced above the mesh grating. The special blend of bacteria comprises a culture of the most effective bacteria for digesting the type of animal waste being processed. Cultured bacteria are fed into the aerobic digestion chamber in large supply, during the initial start up of the process. The ratio of bacteria to waste water in the system can be from approximately 1 part bacteria to approximately 10,000 parts waste water. For example, during the startup of the system, typically one gallon of concentrated and cultured bacteria are used for each 10,000 gallons of wastewater. The optimum amount of bacteria is dependent on the purity of the culture and the concentration of the bacteria in the slurry. Subsequently, after a stable biomass is created, maintenance doses are used. Maintenance doses can be approximately one fourth of the initial startup amount; e.g., ¼ part bacteria to approximately 10,000 parts waste water in the system. The stabilized biomass will continue to generate and become self-sustaining if a constant food source is supplied. Thus, an additional benefit of the present invention is a system that will function with minimal maintenance relying mainly on the natural digestion of animal carcasses with non-pathogenic bacteria.

When processing occurs at atmospheric pressure and an outside temperature between 15° C. and 26° C. (59° F. and 78.8° F.) there is no need to control the temperature. Heat is also generated during the aerobic digestion of the animal carcass. It should be noted that a temperature below 15° C. causes the reaction to take place much slower. A temperature above 26° C. is not desirable because helpful bacteria may be killed resulting in slower digestion. The bacteria themselves can alter the temperature. In cold climates, the temperature in an active basin can be as much as 10° C. above the outside air temperature. Also, while higher temperatures normally found in the summer months will slow down the bacterial activity, the system does not have any significant bacteria loss until the water temperature exceeds 32° C. (89.6° F.). Feeding more makeup water and removing more treated water during the process can reduce water temperature during the warm months.

Air is introduced below the mesh grating to augment the aerobic digestion of the carcass by a special blend of bacteria introduced above the mesh grating. Air increases the speed of digestion thereby creating a stable, primarily liquid, biomass. When a stabilized biomass was created, sludge began to build up in the form of suspended solids. Dissolved oxygen levels in the tank began to rise, indicating that the biomass had stabilized. The Liquid in Unit 2 was then pumped to Unit 3. The pump (14) used in this step is an industrial pump having a minimum flow rate of 500 gallons per minute. A suitable pump is manufactured and distributed by Goulds Pumps, Inc. 240 Fall Street, Seneca Falls, N.Y. The size and type of pump can be selected according to the flow rate desired.

Unit 3. The Secondary Aeration Tank is an open basin (15) that receives the liquid from Unit 2 containing bacteria which tend to stay with the liquid. Here the liquid is treated with air that is introduced at the bottom of the basin (16). Although other sources of oxygen gas may be used to directly aerate the bacteria, it is most economical to use air which is 21% oxygen.

Further digestion of the waste stream occurs producing a mixture which varied in color depending on the type of animal being consumed, typically the color was a yellowish tan. A frothy mixture producing a head of foam of 10.25 centimeters (4 inches) to approximately 15.4 centimeters (6 inches) indicated an active group of bacteria. There were areas in the mixture void of foam where the water was moving too rapidly for the foam to buildup. There was no odor detectable even when within a foot of the mixture. No clumps or solids were visible although there may have been some near the bottom of the basin. Any solids remaining in the mix were eventually consumed. The aerated material in Unit 3 was pumped via mechanical means (17) to a conical settling tank (Unit 4).

Unit 4. In the Conical Settling tank (18) about 50 parts per million (ppm) of a commercially available polymer, such as Agrimond Poly-Clear 100, which is chemically named [poly (diallyldimethylammonium chloride)], was added to clarify the waste stream. It is understood that the amount and type of polymer may vary depending on the type of mixture and the amount of solids in the mix. The polymer encourages particles to clump together and precipitate as sludge (19). The sludge resembles a thick soupy mixture and is drained away to drying beds where natural evaporation of moisture occurs. The clarified liquid portion of the waste stream is pumped to an in-system supply tank (20) which is used to supply fluid to the high pressure pump and nozzles used in Unit 1 (Hydrolaze chamber). Alternatively, water can be returned safely to the environment if treated to meet environmental standards. By using the water in a closed loop for this system, two advantages are gained. First, the hassle of obtaining a permit for returning the water to the environment is omitted. Second, some of the effective bacteria which has been cultured for the advantageous aeration of this particular organic material is returned to the system for further use in disposing of animal carcasses.

Unit 5. Hydrolaze Supply tank (20) is an enclosed chamber having two inlets; one inlet (21) receives the clarified liquid from Unit 4 and another inlet (22) receives make-up water, such as well water, to make up for losses from evaporation, drift, removal of solids and discharge to the aerobic treatment basin (15). The make-up water can be supplied from any source of potable water. The outlet flow (23) is under low pressure (e.g., about 30 psi to about 40 psi) and if recirculated in this disposal system, is fed to the high-pressure pump and nozzles to comminute or pulverize the animal carcasses. Alternatively, as discussed earlier, the water from Unit 5 can be returned safely to the environment; additional processing can be done to obtain the necessary permits and to meet local environmental standards.

DESCRIPTION OF ANOTHER EMBODIMENT

The process of the present invention as shown in FIG. 1 could be accomplished as described above in the preferred embodiment if a standard commercial meat-mincing machine is used instead of the Hydrolaze unit to comminute or pulverize the animal carcass. For example, a commercially available grinder such as one manufactured by JWL Environmental, model "Muffin Monster" could pulverize the complete animal carcass prior to digestion. Whole animals or animal parts or viscera or organs or bones, or combinations of these materials could be passed through hog breaker or prebreaker. These are heavy-duty machines capable of breaking up animal bone and other tissues and are common to the rendering industry. During the pulverization of the carcass, water can be added to create a solid-liquid mixture suitable for processing in the primary aeration tank (Unit 2). Subsequent processing of the animal carcass continues in Units 2 through 5 as disclosed above in the preferred embodiment.

EXAMPLE

Testing of the process was conducted at research facilities in Cape Canaveral, Fla. between March 1999 and July 1999.

To simulate the process, five pounds of ground pork were added to 50 gallons of tap water in a small open basin. 500 ml of Type P bacteria were added to the mix. The simulated wastewater was mixed in an 80-gallon open top plastic reservoir. Wastewater was taken from the bottom of the reservoir, pumped through the venturi to provide sufficient aeration, and returned to the reservoir at an angle for better mixing and circular motion. It was determined that each pound of meat has an equivalent of an average of 750 mg/l of Chemical Oxygen Demand (COD) after it is dissolved in 50 gallons of water.

COD is a measurement of the total amount of organic matter in a waste stream. The COD measurement in this example indicates the meat from pork has a high COD primarily resulting from the protein and fat content. The 750 mg/l COD/lb. of meat in the initial concentration translates to a COD of 3,750 mg/l using 5 lbs. of meat, the bacteria accounted for the remaining COD balance. After processing, the final COD for 5 lbs. of meat was approximately 750 mg/l representing a 5:1 or 80% reduction in the initial COD concentration. Each step in the process contributes to the reduction of the COD concentration.

After the initial phase, the special culture of bacteria was introduced and after about one week, a sufficient biomass was established. Thereafter, ground meat was added on a regular basis (1.5 pounds every three days). At the second phase of the experiment the additional hog parts such as neck bones and feet were added. It took two days for the parts to be digested by the bacteria. Also, within the first two days, the bacteria started digesting/pitting the bones.

Figure 3:
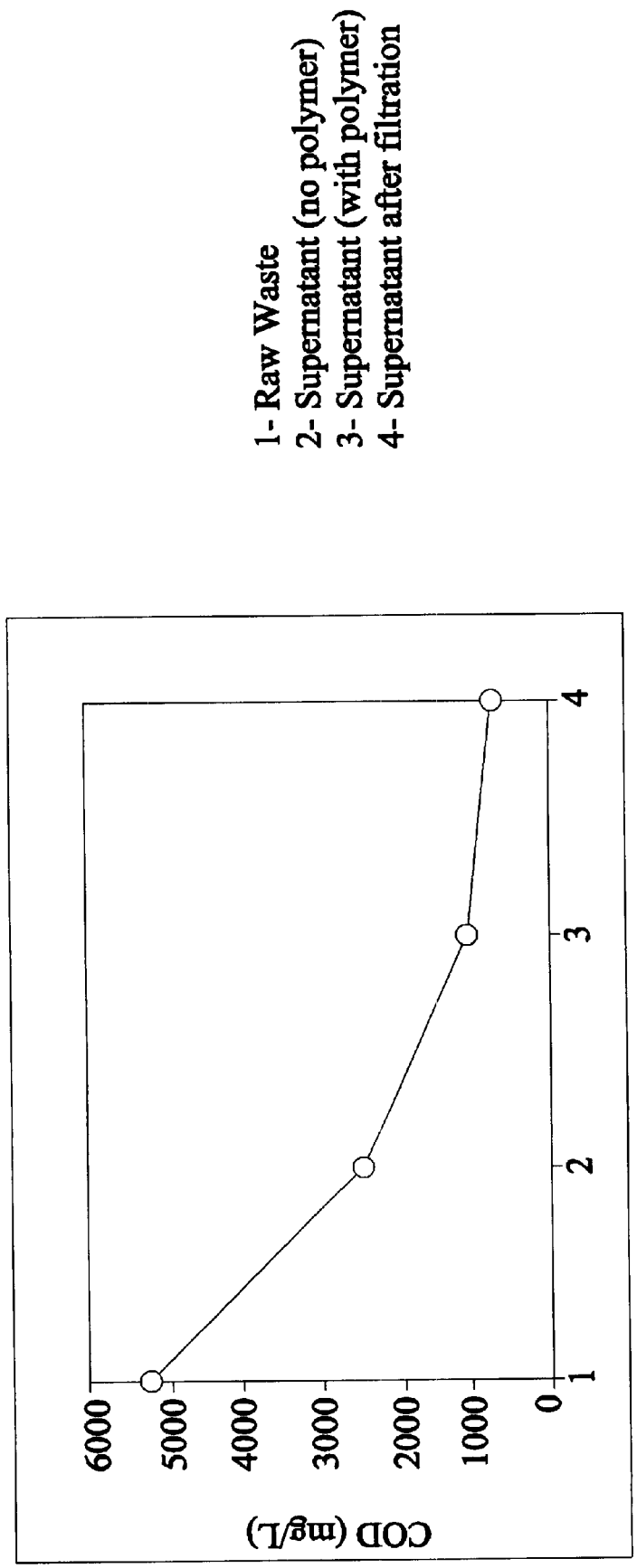
FIG. 3 is a graph showing the reduction of organic matter as measured by chemical oxygen demand (COD) during the final clarification of effluent.

For the clarification step as outlined above in Unit 4, no polymers, several different polymers at various dosages in combination with a filtration step were used to determine clarification effectiveness. FIG. 3 shows chemical oxygen demand (COD) reduction after settling without polymer, with polymer, and with polymer followed by filtration.

The ultimate benefits of the proposed system were the ability to handle dead hogs on-site in an economical, environmentally friendly process and without creating noxious odors. All processing is contemplated for above ground tanks and could conceivably operate as a gravity fed system except for the return of the clarified liquid to the first treatment chamber. Thus, the installation of pumping equipment is viewed as an optional means of moving the aerobically treated animal carcass from one tank or chamber to another.

A surprising and unexpected benefit in this process is the speed with which an animal carcass can be completely disposed of in the combinations of steps outlined. The key finding is the identification of the bacteria that are most effective in digesting or consuming the carcass, culturing these bacteria, and introducing them to the aeration tank with the comminuted, masticated carcass. In a matter of approximately two to approximately seven days, the carcass can be completely digested and reduced to a sludge suitable for soil conditioning when dried and a clarified liquid for further use in processing or safe return to the environment. In other words, animals that were once alive and well are reduced to dust and water in a matter of days.

Although the preferred embodiment is applying the invention to animal carcasses, particularly, dead hogs, it is reiterated that the invention can be applied to other carcasses such as, but not limited to, mammals, marine animals, and the like.

While the invention has been described, disclosed, illustrated and shown in various terms of certain embodiments or modifications which it has presumed in practice, the scope of the invention is not intended to be, nor should it be deemed to be, limited thereby and such other modifications or embodiments as may be suggested by the teachings herein are particularly reserved especially as they fall within the breadth and scope of the claims here appended.

We claim:

1. A method of digesting animal carcasses with bacteria in the presence of air comprising the steps of:
   (a) isolating the bacteria from a sample of an animal carcass to be digested;
   (b) culturing a portion of the bacteria;
   (c) feeding a substantial portion of the cultured bacteria to an aerobic digestion chamber containing waste water stream containing a comminuted animal carcass during an initial startup phase; and
   (d) providing an additional portion of the cultured bacteria to the aerobic digestion chamber after the initial startup phase.

2. The method of claim 1, wherein the animal carcass is not primarily meatpacking waste or animal waste.

3. The method of claim 1, wherein the feeding step includes the step of:
   applying a ratio of approximately 1 part of the bacteria to approximately 10,000 parts waste water.

4. The method of claim 1, wherein the cultured bacteria for the initial startup phase causes the biological digestion of the comminuted animal carcass.

5. The method of claim 1, wherein air is used for the aerobic treatment of the waste water to create a stabilized biomass.

6. The method of claim 1, wherein the additional portion is approximately one-fourth the amount of the bacteria used in the initial startup phase.

7. A process for the aerobic treatment of dead carcasses with a bacteria treatments, comprising the step of:
   (a) forming a stream of waste water containing at least one comminuted carcass;
   (b) feeding the waste water into an aerobic digestion chamber;
   (c) culturing a portion of bacteria from a sample carcass;
   (d) feeding the cultured bacteria to the aerobic digestion chamber containing the waste water; and
   (e) aerobically digesting portions of the waste water with the cultured bacteria in the aerobic digestion chamber.

8. The process of claim 7, further comprising the step of:
   adding a maintenance dose of the cultured bacteria to the aerobic digestion chamber.

9. The process of claim 8, wherein the maintenance dose includes:
   approximately one-fourth of the cultured bacteria.

10. The process of claim 7, wherein the ratio of the cultured bacteria to the waste water is approximately 1 part bacteria to approximately 10,000 parts waste water.

11. The process of claim 7, wherein the step of aerobically digesting includes the step of:
    providing air to the waste water in the aerobic chamber to form a stabilized biomass.

12. The process of claim 7, wherein the culturing step further includes the step of:
    isolating the portion of the bacteria from a sample of the comminuted carcass to be digested.

13. The process of claim 7, wherein the comminuted carcass includes:
    an animal carcass.

14. The process of claim 7, wherein the comminuted carcass is selected from at least one of:
    a mammal carcass and a marine animal carcass.

15. A process of digesting dead carcasses with bacteria in the presence of air, comprising the steps of:
    (a) forming a stream of waste water containing portions of a comminuted carcass;
    (b) feeding a portion of the waste water to a digestion chamber;
    (c) providing approximately 1 part bacteria to approximately 10,000 parts of the waste water to the digestion chamber; and
    (d) aerobically digesting portions of the waste water in the digestion chamber.

16. The process of claim 15, wherein the bacteria is formed by:
    isolating the bacteria from the sample of the carcass; and
    culturing the bacteria.

17. The process of claim 15, wherein the aerobically digesting step further includes the step of:
    feeding air to the digestion chamber to form a stabilized biomass.

18. The process of claim 15, further comprising the step of:
    providing a maintenance dose of the bacteria to the waste water in the aerobic digestion chamber.

19. The process of claim 18, wherein the maintenance dose includes:
    approximately one-fourth of the bacteria.

20. The process of claim 15, wherein the comminuted carcass is selected from at least one of:
    an animal carcass, a mammal carcass and a marine animal carcass.

* * * * *